United States Patent
Hart et al.

(10) Patent No.: US 8,417,271 B2
(45) Date of Patent: *Apr. 9, 2013

(54) DISPATCH APPLICATION UTILIZING SHORT MESSAGE SERVICE

(75) Inventors: John P. Hart, Raleigh, NC (US); Wayne H. Smith, Charleston, SC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,712

(22) Filed: Apr. 24, 2012

(65) Prior Publication Data

US 2012/0208572 A1    Aug. 16, 2012

Related U.S. Application Data

(63) Continuation of application No. 13/049,467, filed on Mar. 16, 2011, now Pat. No. 8,185,142, which is a continuation of application No. 12/410,256, filed on Mar. 24, 2009, now Pat. No. 7,929,982, which is a continuation of application No. 11/866,026, filed on Oct. 2, 2007, now Pat. No. 7,509,136, which is a continuation of application No. 09/486,787, filed as application No. PCT/US99/15137 on Jul. 6, 1999, now Pat. No. 7,277, 717.

(60) Provisional application No. 60/091,810, filed on Jul. 6, 1998.

(51) Int. Cl.
*H04W 4/00*    (2009.01)
*H04L 12/58*    (2006.01)
*H04L 29/08*    (2006.01)

(52) U.S. Cl. .................. 455/466; 455/412.1; 455/414.4

(58) Field of Classification Search .... 455/412.1–412.2, 455/414.1–414.2, 418–420, 466, 414.3, 414.4, 455/500; 370/312, 328; 709/206
See application file for complete search history.

(56) References Cited

U.S. PATENT DOCUMENTS

| | | | |
|---|---|---|---|
| 4,922,514 A | | 5/1990 | Bergeron et al. |
| 5,528,660 A | * | 6/1996 | Heins et al. ..................... 379/21 |
| 5,533,093 A | | 7/1996 | Horton et al. |
| 5,615,121 A | * | 3/1997 | Babayev et al. ............. 705/7.22 |
| 5,636,122 A | * | 6/1997 | Shah et al. .................... 701/454 |
| 5,719,918 A | * | 2/1998 | Serbetciouglu et al. ...... 380/271 |
| 5,729,537 A | | 3/1998 | Billstrom |
| 5,737,728 A | | 4/1998 | Sisley et al. |
| 5,797,089 A | | 8/1998 | Nguyen |
| 5,838,768 A | * | 11/1998 | Sumar et al. ................ 379/88.14 |
| 5,870,667 A | * | 2/1999 | Globuschutz ................. 455/419 |
| 5,878,351 A | | 3/1999 | Alanara |
| 5,922,514 A | * | 7/1999 | Person et al. ................. 430/311 |

(Continued)

OTHER PUBLICATIONS

International Patent Application No. PCT/US1999/15137: International Search Report dated Oct. 22, 1999, 1 page.

(Continued)

*Primary Examiner* — Brandon Miller
(74) *Attorney, Agent, or Firm* — Woodcock Washburn LLP

(57) ABSTRACT

A dispatch communication and management system method is provided, allowing a dispatcher and remote service technicians to exchange messages over a network in a prescribed format to notify the technicians of new dispatch orders, and to update status information for dispatch orders in corresponding customer service records in a database.

18 Claims, 8 Drawing Sheets

U.S. PATENT DOCUMENTS

| | | | |
|---|---|---|---|
| 5,966,663 A * | 10/1999 | Gleason | 455/466 |
| 6,026,292 A | 2/2000 | Coppinger et al. | |
| 6,047,194 A * | 4/2000 | Andersson | 455/466 |
| 6,067,529 A * | 5/2000 | Ray et al. | 705/24 |
| 6,134,432 A | 10/2000 | Holmes et al. | |
| 6,240,295 B1 * | 5/2001 | Kennedy et al. | 455/456.4 |
| 6,292,473 B1 * | 9/2001 | Duske et al. | 370/316 |
| 6,304,558 B1 | 10/2001 | Mysore | |
| 6,304,881 B1 * | 10/2001 | Halim et al. | 1/1 |
| 6,731,942 B1 * | 5/2004 | Nageli | 455/458 |
| 7,277,717 B1 * | 10/2007 | Hart et al. | 455/466 |
| 7,509,136 B2 * | 3/2009 | Hart et al. | 455/466 |
| 7,929,982 B2 * | 4/2011 | Hart et al. | 455/466 |
| 8,185,142 B2 * | 5/2012 | Hart et al. | 455/466 |
| 2009/0270093 A1 | 10/2009 | Lee | |

OTHER PUBLICATIONS

U.S. Appl. No. 09/486,787: Examiner Interview Summary Record mailed Nov. 22, 2005, filed Mar. 2, 2000, 2 pages.

U.S. Appl. No. 09/486,787: Examiner Interview Summary Record mailed Apr. 12, 2006, filed Mar. 2, 2000, 2 pages.

U.S. Appl. No. 09/486,787: Examiner Interview Summary Record mailed Jun. 27, 2007, filed Mar. 2, 2000, 1 page.

U.S. Appl. No. 09/486,787: Final Rejection mailed Apr. 11, 2007, filed Mar. 2, 2000, 10 pages.

U.S. Appl. No. 09/486,787: Final Rejection mailed Feb. 25, 2005, filed Mar. 2, 2000, 11 pages.

U.S. Appl. No. 09/486,787: Final Rejection mailed Nov. 22, 2005, filed Mar. 2, 2000, 12 pages.

U.S. Appl. No. 09/486,787: Non-Final Rejection mailed Apr. 3, 2002, filed Mar. 2, 2000, 8 pages.

U.S. Appl. No. 09/486,787: Non-Final Rejection mailed Apr. 12, 2006, filed Mar. 2, 2000, 12 pages.

U.S. Appl. No. 09/486,787: Non-Final Rejection mailed Aug. 30, 2006, filed Mar. 2, 2000, 12 pages.

U.S. Appl. No. 09/486,787: Non-Final Rejection mailed Jul. 12, 2005, filed Mar. 2, 2000, 12 pages.

U.S. Appl. No. 09/486,787: Notice of Allowance and Fees, mailed Jun. 27, 2007, filed Mar. 2, 2000, 5 pages.

ETSI TS 101 351 V8.7.0 (Dec. 2001); Digital Cellular Telecommunications System (Phase 2+); General Packet Radio Service (GPRS); Mobile Station—Serving GPRS Support Node (MS-SGSN) Logical Link Control (LLC) layer specification (3GPP TS 04.64 version 8.7.0 Release 1999); GSM; ETSI; 64 pages.

ETSI TS 101 297 V8.2.0 (Sep. 2001); Digital Cellular Telecommunications System (Phase 2+); General Packet Radio Service (GPRS); Mobile Station—Serving GPRS Support Node (MS-SGSN); Subnetwork Dependent Convergence Protocol (SNDCP); (3GPP TS 04.65 version 8.2.0 Release 1999); GSM; ETSI; 47 pages.

ETSI EN 301 347 V7.5.1 (Dec. 2000); Digital Cellular Telecommunications System (Phase 2+); General Packet Radio Service (GPRS); GPRS Tunnelling Protocol (GTP) across the Gn and Gp Interface; (GSM 09.60 version 7.5.1 Release 1998); GSM; ETSI; 67 pages.

ETSI TS 101 348 V7.10.1 (Jun. 2005); Digital Cellular Telecommunications System (Phase 2+); General Packet Radio Service (GPRS); Interworking between the Public Land Mobile Network (PLMN) supporting GPRS and Packet Data Networks (PDN); 3GPP TS 09.61 version 7.10.1 Release 1998); GSM; ETSI; 51 pages.

ETSI GSM 10.60 V5.4.0 (Mar. 1998); Digital Cellular Telecommunications System (Phase 2+); General Packet Radio Service (GPRS); Project Scheduiing and Open Issues; (GSM 10.60 Version 5.4.0 Release Mar. 1993); GSM; ETSI; 31 pages.

* cited by examiner

DISPATCH APPLICATION UTILIZING SHORT MESSAGE SERVICE

CROSS REFERENCE TO RELATED APPLICATIONS

The instant application is a continuation application of, and claims priority to, U.S. patent application Ser. No. 13/049,467, filed Mar. 16, 2011, which is a continuation application of, and claims priority to U.S. patent application Ser. No. 12/410,256, filed Mar. 24, 2009, which is a continuation application of, and claims priority to U.S. patent application Ser. No. 11/866,026, filed Oct. 2, 2007, which is a continuation application of, and claims priority to U.S. patent application Ser. No. 09/486,787, filed Mar. 2, 2000, which is a national stage application of, and claims priority to PCT/US99/15137, filed Jul. 6, 1999, which claims the benefit of U.S. provisional patent application Ser. No. 60/091,810, filed Jul. 6, 1998. U.S. patent application Ser. No. 13/049,467, U.S. patent application Ser. No. 12/410,256, U.S. patent application Ser. No. 11/866,026, U.S. patent application Ser. No. 09/486,787, national stage application of PCT/US99/15137, and U.S. provisional patent application Ser. No. 60/091,810 are each hereby incorporated by reference in their entireties.

TECHNICAL FIELD

This invention relates to personal communications systems (PCS) and, more particularly, to providing wireless "e-mail" type messaging services between mobile service technicians and a dispatcher. Methods and apparatus for implementing such services are disclosed, including methods of using cellular technology operating according to the GSM (Global System for Mobiles) protocol.

BACKGROUND

For many years various public utilities, public transportation companies and other organizations that use a highly mobile fleet of service personnel have dispatched orders to those personnel via wireless radio or cellular phone calls. Such dispatch systems are expensive because they tend to be smaller than public systems and thus use equipment that is manufactured in small volumes, which eliminates economies of scale. Likewise, such systems often involve creating an expensive private network from scratch. On the other hand, public wireless telecommunication networks, including cellular and PCS, have recently become far more ubiquitous, feature rich and cost effective. Those systems have not, until recently, provided the type of messaging capability best suited for managing dispatch operations.

That has changed with the advent of SMS services. SMS (or Short Message Service) is part of the Global System for Mobile communications (GSM) digital standard, originally only at 900 MHz but later also at 1800 MHz (also known as DCS 1800), 1900 MHz (also known as PCS 1900) and 800 MHz (E-GSM). SMS provides the ability to send and receive short messages of up to 160 characters of text through a mobile terminal, or cell phone. The SMS service functions similarly to two-way paging, but it is rapidly evolving into an electronic messaging ("e-mail") system. With the appropriate software, users may send, receive, and forward messages from a personal computer (PC) to single addressees, or groups of addressees. These SMS messages are managed by the user's telephone Service Center in a "store and forward" manner, similar to e-mail, such that delivery is guaranteed. Thus, when the target telephone is unavailable due to being out of service area, etc., the network will hold the message and deliver it shortly after the phone comes back into range. The message can be sent by a central paging service, or by a compatible handset.

Not all digital phones are capable of transmitting SMS messages, but most current digital phones can receive them, as long as the network operator has the facility enabled. The SMS message text may be keyed into the mobile phone using the phone's keypad, and with some telephone models, through a full QWERTY keyboard with which the model is adapted to interface.

Under the GSM protocol each network provides one or more Service Centers, and each of these can send to any GSM mobile on any network. These Service Centers ("SC") provide a store-and-forward SMS function, which holds the message until it can be delivered or until a SMSC timeout occurs. In SMS operation, a user may enter a correspondent's (or addressee's) mobile number, type a message, and forward the message to the user's SC. The SC address is normally stored in the phone and/or SIM card. The cellular exchange routes the SMS message in an SCCP packet within the GSM's TDMA frame format. International SCCP messages are routed based on a Global Title. The Global Title used for SMS is the Service Center address. The SCCP packet is passed from exchange to exchange until it reaches the destination Service Center. Each exchange along the route inspects the Global Title and uses this to route the message to the next exchange in the chain.

Once the message is received at the correspondent's SC, the addressed center sends back a confirmation in a return SCCP packet, either directly to the user's SMSC or to the nearest exchange, and the confirmation is routed in similar fashion back to the original cellular exchange and on to the user's mobile unit. When a message is received by the phone, it will be stored in the SIM (subscriber identity module) smart card, and will be available to be read whenever needed. It will be saved until you delete it, allowing use as a simple notepad. Most phones can be configured to beep when a message is received, or just light up an indicator on the display if beeping would be unacceptable. Depending upon the phone and the SIM, you can usually store between 5 and 50 messages. SMS is also used for "internal" messages, such as activating a new mobile telephone, remote programming of telephone numbers into a user's SIM telephone directory, and alerting the user of voicemail.

It is desirable to use SMS messaging to dispatch orders to service providers. In order to further automate and manage dispatch orders to multiple service technicians or providers, gateway software must be developed by which SMS messages may be sent and received to a computer, and displayed in a WINDOWS based application format on a monitor. The gateway software connects the computer to a GSM handset via an interface, such as a data card or special cable, and allows the user to access all the messages currently stored in the phone, send new messages, and even have incoming messages sent straight through to the user's computer (without the phone beeping). Such a gateway would also enable an address book through which messages can be sent to one or multiple technicians on a distribution list, in one action, although the messages are actually sent or transmitted one after the other.

SUMMARY

The present invention uses a dispatch communication protocol, preferably based on the SMS function of the GSM specification, to alternately exchange messages among a dispatcher and one or more remote service technicians in a prescribed format to enter event information into a customer service record. The message exchange between dispatcher and technician is formatted in accordance with the business record format of the service organization, such that the message response of either party is queued to an ordered field entry in a customer service record.

In one embodiment, the dispatch messaging may be implemented in the SMS function of the PCS 1900 derivative of the GSM protocol. Communication devices, including cellular phones, wireless transceivers or the like, are adapted to formulate and receive SMS messages. At least one such communication device is coupled to each service technician's mobile computer, which could be a laptop or personal organizer (such as a PalmPilot®, Wizard, or other hand-held computer). Alternatively, the communication device can have a computer integrated with the wireless transceiver, such as "smart-phones" like the Nokia 9000.

A dispatch computer acts as a central processor for formulating work orders for dispatch to service technicians' communication devices and for receiving updates from such technicians regarding the status of work orders. The dispatch computer formulates each new work order into a message with the appropriate protocol, such as SMS. The dispatch computer forwards the message to the selected service technician via a wireless communications network capable of delivering the SMS (or other) message. To forward the message, the dispatch computer either couples directly to the network or initiates a wireless SMS communication. For instance, the dispatch computer may couple to the SMS via a TCP/IP connection. Messages for service technicians are transferred via a TCP/IP session from the dispatch computer to the SMSC. Or, the dispatch computer can be coupled to a communication device for formatting the work order into an SMS message and sending it over the wireless network. In either event, the network thereafter routes the messages to the selected service technician.

The dispatch computer may couple to a database that stores various work orders and indicates their status. SMS messages from service technicians inform the dispatch computer of any status changes, which information is used to update the database. A graphical user interface allows the dispatch operator to view the status of work orders in the database, to search the database, to update the database records manually, to inform the dispatch operator of which service technicians are available, or to create new work orders. Fields are provided for the new work orders, which thereafter are formulated into SMS messages and sent by command of the dispatch operator as described above to the selected service technician.

By taking advantage of an existing wireless communications protocol such as GSM, the present invention avoids the necessity of building and maintaining a separate data network for managing work orders. Other existing wireless protocols may be used with the management aspects of this invention, including by way of example a two way paging service or messaging via the GPRS protocol. This invention aims to achieve one, multiple, or combinations of the following objectives: To provide methods and apparatus for establishing interactive wireless message communications between a central dispatcher and one or more service technicians. To establish a bi-directional dispatch per call that facilitates message forwarding and retrieval in non-real time. To provide an electronic messaging protocol that allows a central dispatcher and a field service technician to interactively access and complete a service customer's record. To take advantage of the presently available and deployed short messaging service standard within the GSM wireless telecommunications protocol in order to provide dispatch management. To provide SMS dispatch software configured with the mobile telephone numbers or other identifiers of various service technicians who will fulfill the dispatch order.

These and other objects, features, and advantages of the present invention will become more apparent in light of the following detailed description of an embodiment thereof, as illustrated in the accompanying Figures.

DETAILED DESCRIPTION OF ILLUSTRATIVE EMBODIMENTS

Figure 1:
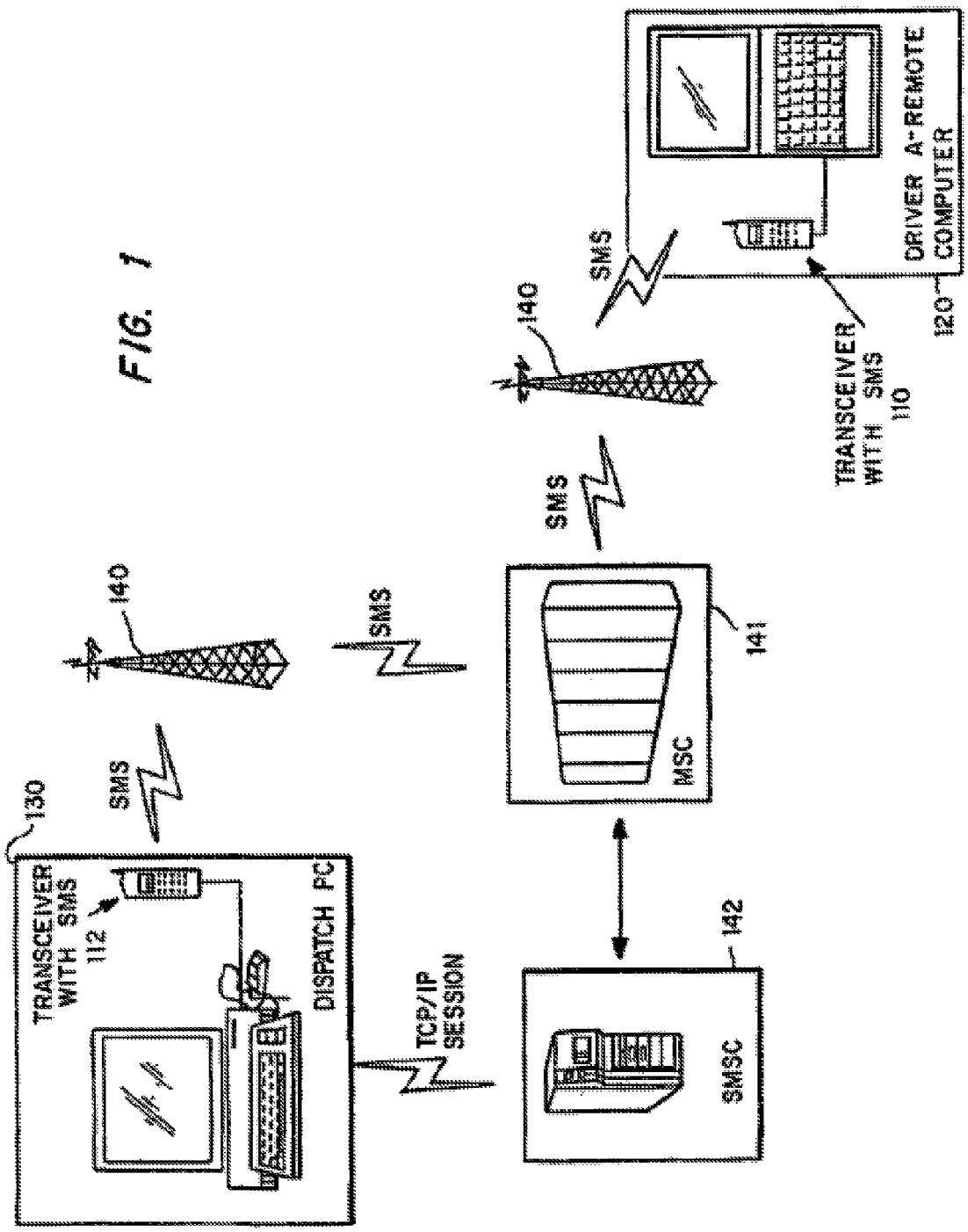
FIG. 1 is a schematic diagram of apparatus in which the message protocol of the present invention may be implemented.

Reference will now be made in detail to alternative embodiments of the invention, examples of which are illustrated in the accompanying drawings. Wherever possible, the same reference numbers will be used throughout the drawings to refer to the same or like parts.

Terminology

Before describing the drawings and embodiments in more detail, several terms are described below in an effort to clarify the terminology used in this document. Additional and fuller understanding of these terms will be clear upon reading this entire document: Communication device: A communication device is a handset, cellular phone, cellular transceiver or other hardware capable of sending or receiving wireless messages according to this invention. By way of example, communication devices include both "smart-phones" that integrate computer processors with cellular transceivers, as well as the basic hardware and firmware needed to send and receive wireless messages, such as the wireless transceiver alone. Dispatch order: A dispatch order is a work order related to a particular job or task assigned a selected service technician by the dispatcher. The job or task can vary according to the particular type of service being performed by the technician (e.g., the technician may be servicing electrical lines, meters, water & gas lines, telephone lines, or providing other services such as cleaning, security, landscaping, delivery, etc.) Also, dispatch orders include general orders or information sent to all service technicians, as well as merely job specific orders.

Overview

This invention uses a client-service architecture in which the dispatch computer operates as a server to multiple "client" smart-phones or to communication devices coupled to a computer. Many alternative embodiments exist in which the "client" smart-phones can be replaced with a "client" comprising a computer (or personal digital assistant, organizer, laptop, or the like) and an appropriate communication device with SMS functionality. For instance, many service providers have equipped their service technicians with laptop computers or personal digital assistants in order for the field technicians to track dispatch orders and other service information. Such mobile computers can be coupled to any cellular phone equipped with a transceiver and SMS functionality (or to just the hardware for transceiving messages or implementing SMS functionality). Such communication devices may be less expensive than the smart-phones, but still allow the user full SMS connectivity back to the server dispatch computer.

In one embodiment, the user may acquire two or more cellular telephones and subscribe to a cellular service for these phones that allows for the origination of Short Messages from his handset. All PCS-1900 phones are capable of originating and receiving short messages, but often the ability to originate messages is usually sold as an option and must be paid for by subscribers. The phones utilized with this invention can thus be any available handset including those that have serial connections to a computer or the newer "smart" phones that have integrated keyboards and displays similar to personal digital assistants. If the user chooses to use a smart phone, then it is not necessary to purchase or provide a personal computer with that telephone.

To implement one embodiment of the invention, a "smart" phone may be used for the driver's computer and communication device. For the dispatcher, an IBM compatible computer connected to a PCS-1900 handset, such as Nokia's 5190 handset, via a serial data cable. Custom dispatch software may be created utilizing Microsoft Visual Basic version 5.0 that will run on any personal computer that is using any of Microsoft Windows 95, Windows 98, Windows NT, or Windows CE. Of course, persons skilled in the art will recognize that similar software may be created to run on other operating systems. In any event, the dispatch software (described below) connects the telephones with a dispatch order or job ticket database and manages both incoming and outgoing SMS (or other) messages.

FIG. 1 shows one embodiment of the present invention, depicting the personal communication devices 110 and 112 that may be used by the communicating parties. Such devices may be BellSouth Mobility DCS handsets that utilize the FCC allocated frequencies in the 1.9 GHz radio spectrum and that are based on the GSM 20 protocol. These wireless handsets 110 and 112 are available from the BellSouth Corporation, and require the user to subscribe to a Mobile Originate Short Message Service that allows a message of up to 160 ASCII characters to be sent from one handset to another or other services such as PCS or the like. It should be understood, however, that the present invention utilizes the Short Message Service capability, regardless of the particular cellular handset technology or its frequency, and that the present messaging protocol can be developed for either TDMA or CDMA handsets.

FIG. 1 shows routing of messages to and from service technicians' handset 110 via a cellular network's infrastructure 140 and Mobile Switching Center ("MSC") 141. SMSC 142 receives the messages from MSC 141 and routes the messages to the appropriate destination.

Figure 3:
FIG. 3 is an illustrative diagram of another screen display of the menu-based program of FIG. 2.
Figure 4:
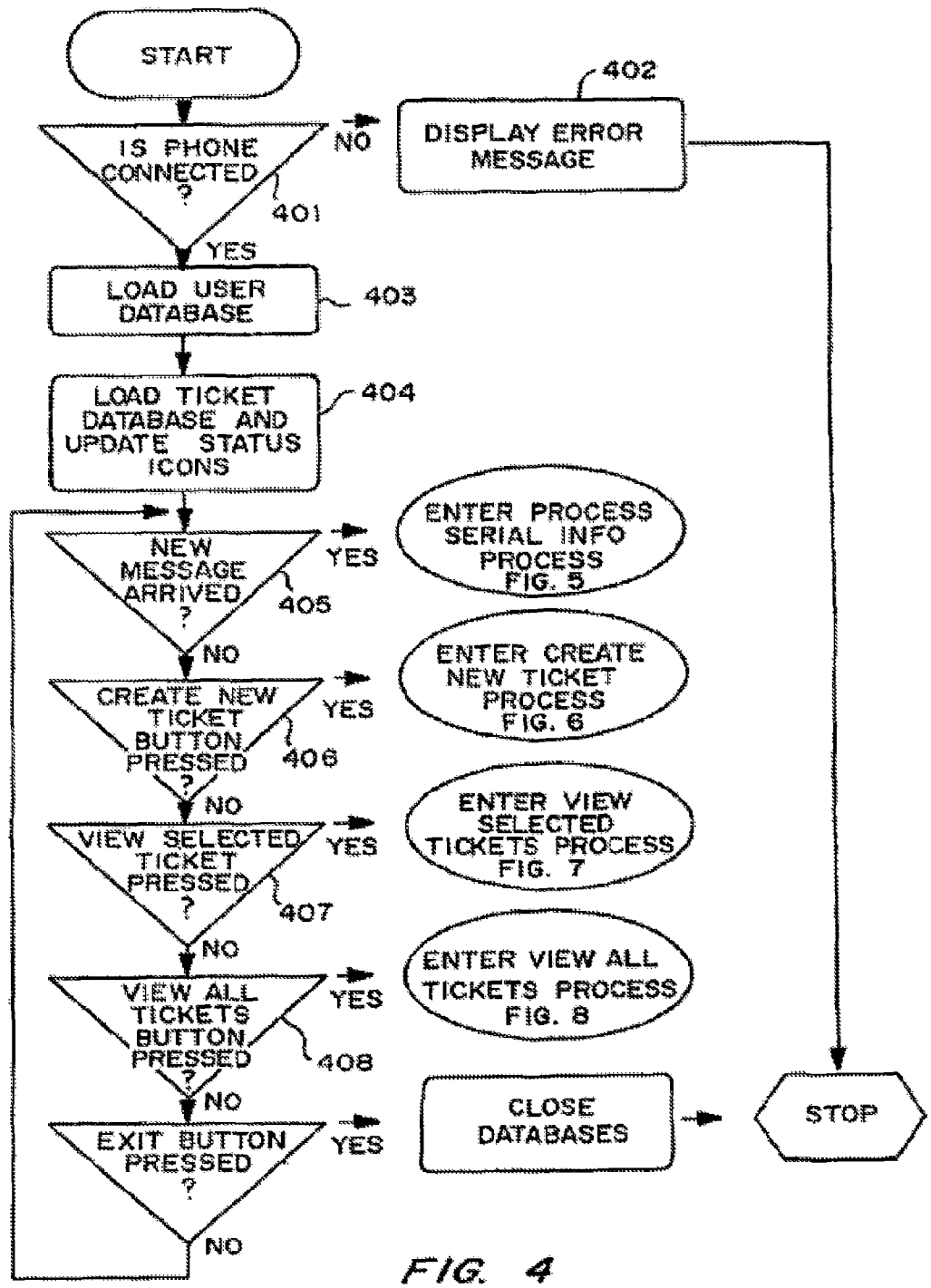
FIG. 4 is a flow chart depicting exemplary dispatch applications main program flow.

By leveraging the ability to quickly and accurately send short messages between handsets, dispatch software allows for automation and management of dispatch operations. For example, this invention could allow a dispatcher equipped with a PCS-1900 handset 112 to send details about a pending job to a service technician who is located in the field. The service technician's handset 110 receives the message, converts it to a format that represents a job ticket and displays it on the service technician's computer 120. The service technician then follows the instructions in the job ticket, an example of which is shown in FIG. 3. Thus, the technician may drive to the address specified in the job ticket and perform the necessary work. Upon completion of this work, the driver changes the job status in the ticket (e.g. to completed, part needed, or some other appropriate description) and sends the information back to the dispatcher via the SMS capabilities in his handset 110.

A database may be configured with a list of names and phone numbers of service technicians. These names and numbers correspond to the individual service technicians receiving open job tickets. For example, if Bill Smith is a technician who assigned mobile number 123-456-7890 then that information will be provided in a database for use with the SMS dispatch software. Once an identifying mobile number is entered into the SMS dispatch software, whenever the dispatcher specifies a message for Bill Smith, the message will be sent to the identified mobile number 123-456-7890. Of course, other indicia may be used to identify service technicians if other communications protocols are used to implement certain aspects of this invention. Further, the database may be used to support messages to all or groups of technicians within the database.

When the dispatcher's computer 130 receives a reply message from a service technician, it will notify the dispatcher that the job is completed, delayed, etc. On her screen, the job ticket 300 is moved into the appropriate category, such as from the open tickets listing to the closed tickets listing. The dispatcher then has the ability to review the information the driver entered into the ticket.

Figure 2:
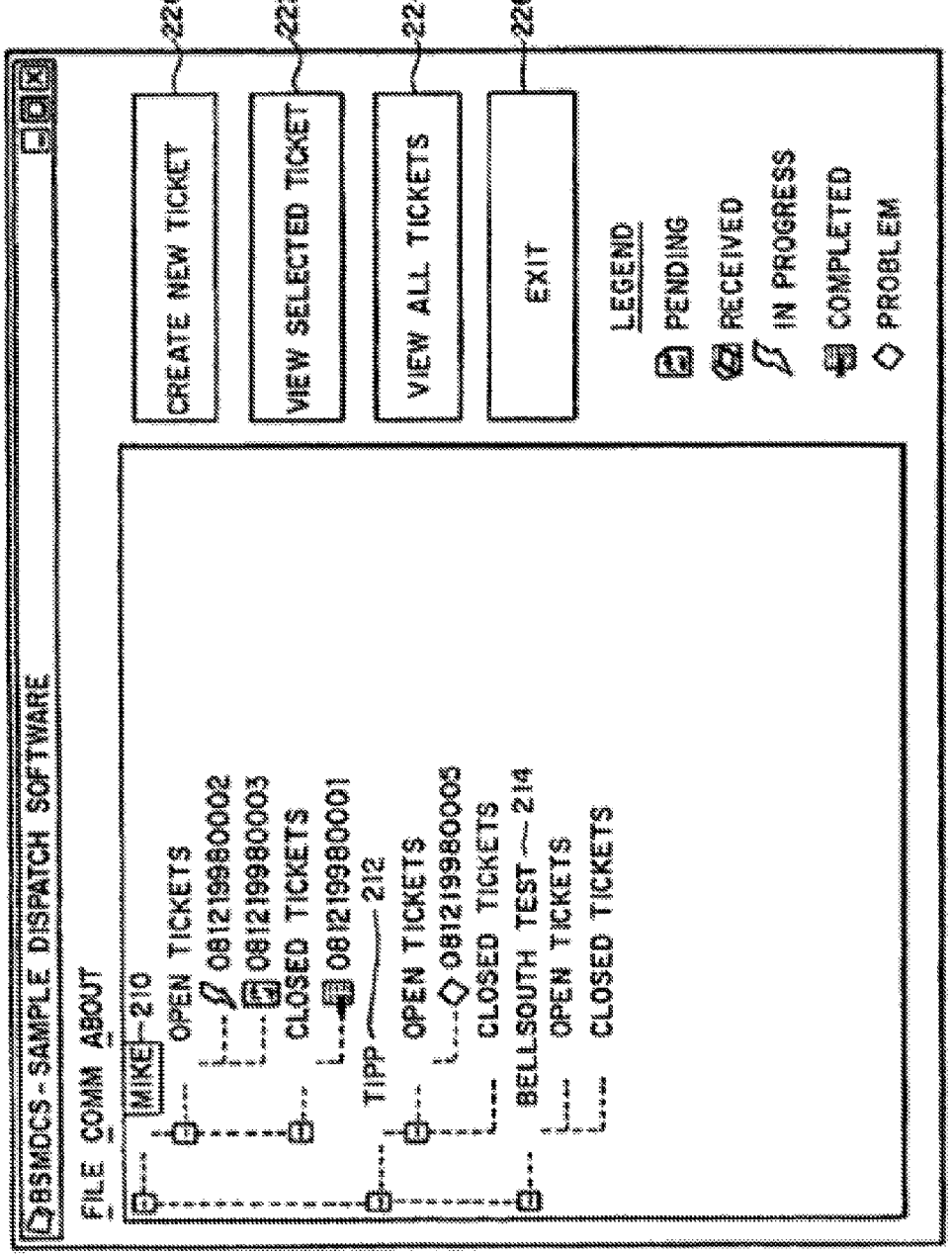
FIG. 2 is an illustration of one screen display of a menu-based program embodying exemplary message management methods of the present invention.

FIG. 2 depicts exemplary information that may be made available for viewing by the dispatcher, including each service technicians' 210, 212, 214 open and closed tickets, as well as various functions the dispatcher can initiate. For instance, FIG. 2 shows that the dispatcher can use the create new ticket function 220 if a new work order arrives. The dispatcher can also use the view selected tickets 222 or view all tickets 224 functions to determine status of work orders and capacity of particular service technicians. An exit function 226 closes out the program.

Alternative Embodiments

Although this invention may be deployed over a GSM network outfitted with SMS capability, alternative architectures and protocols may be used to transfer the messages from a dispatch computer to service technicians and vice versa. For instance, an alternative embodiment of this invention may use the architecture and protocols of the General Packet Radio System ("GPRS"), two-way paging networks, or other wireless protocols that allow transfer of short data messages to and from service technicians. The GPRS protocol provides, in particular, architectures and various interface layers (both hardware and software) for implementing a packet data system across existing wireless networks, regardless of the type wireless protocol (e.g., TD meg, CD meg, GMS) used by those networks. Certain GPRS protocols for implementing this architecture are described in the following documents, each of which is incorporated in its entirety by this reference: (1) GPRS MS-SGSN LLC, GSM 04.64 (ETSI No. TS 101 351); (2) GPRS MS-SGSN SNDCP, GSM 04.65 (ETSI No. TS 101 297); (3) IW PLMN GPRS-PDN GSM 09.60 (ETSI No. EN 301 347); (4) GPRS PDN, GSM 09.61 (ETSI No. TS 101 348); and (5) Digital Cellular Telecommunications System (Phase 2+): GPRS Project scheduling and open issues, GSM 10.60.

In a GPRS capable network the handshakes generated by wireless devices inform the base stations that a particular transaction is a packet data transaction; in turn, the base stations so inform a base station controller, which can then route the packet data to a support node rather than an MSC and its supporting infrastructure. The support node may communicate with other public wireless or wired networks or with an IP (internet protocol) network. By, for instance, repackaging the wireless data message into an internet packet, the support node interfaces more easily between the base stations and the IP network than existing wireless systems. This protocol may result in not only higher data transmission rates (i.e., larger data payloads than the limited SMS packets), but also in faster data delivery since data transfer does not require signaling to set up connections among network elements.

Dispatch Software

FIGS. 4 through 8 depict exemplary steps implemented in software to operate a dispatch management application. By way of example, assume that dispatch software has been tailored for a gas, electric, water, telecommunications or other utility company. A dispatcher accesses a computer 130 running the dispatch software and connected to a communication device 112, such as an SMS capable phone, like a PCS-1900 telephone. The software first checks the connection at step 401 of the communication device 112 and computer 130, informing the dispatcher with an error message at 402 if there is no connection. Computer 130 then loads the user database at step 403 and the ticket or dispatch order database at step 404. Computer 130 automatically updates the status information and icons within the dispatch order database.

Thereafter, computer 130 enters one of four processes: process new messages function 405, create a new ticket function 406, view selected ticket function 407 or view all tickets function 408. FIGS. 4 through 8, respectively, detail the steps performed by these functions.

Figure 5:
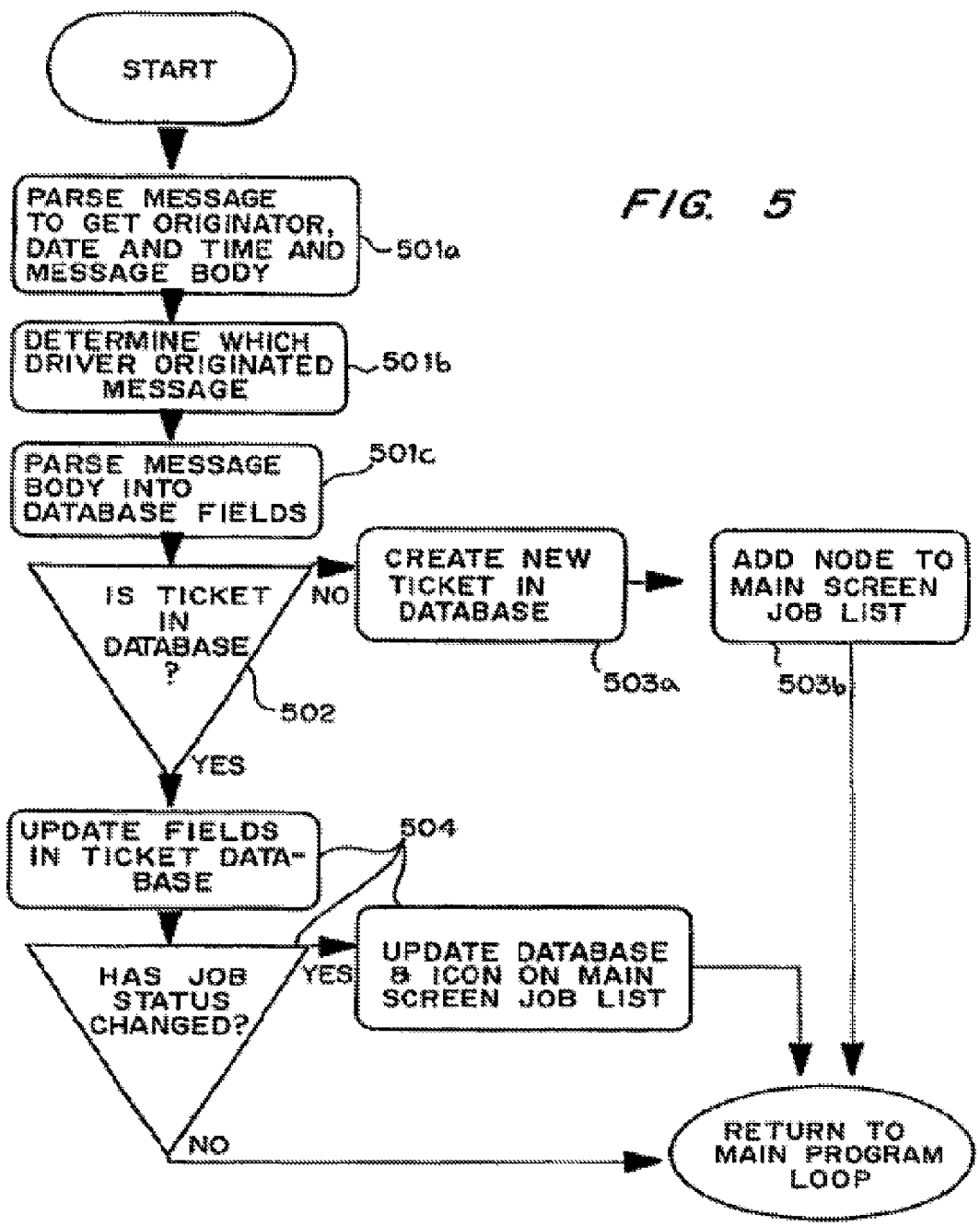
FIG. 5 is a flow chart depicting exemplary steps for processing new messages.
Figure 6:
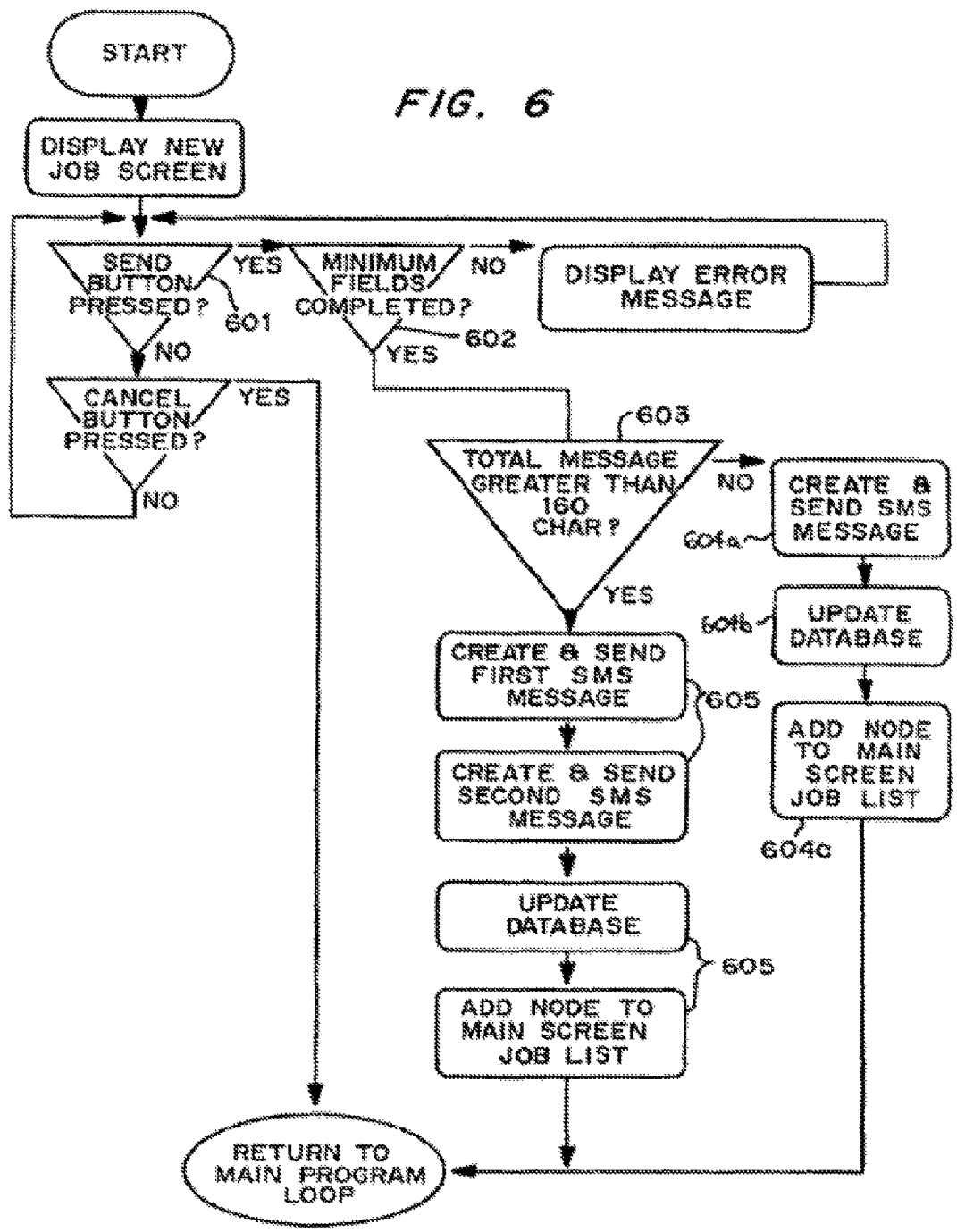
FIG. 6 is a flow chart depicting exemplary steps for creating a new ticket and sending the ticket to a service provider.

FIG. 5 shows that when a reply message from a service technician arrives, step 501a-c processes the message, determining its originator, date and time, and other parameters for storage in the dispatch order database. Step 502 checks to confirm the dispatch order is in the database, and, if not, step 503a-b creates a new entry. If the dispatch order was in the database, step 504 updates the fields with the information from the reply message. Whenever a job ticket is opened, i.e., connect electrical service, the dispatcher would click the "Create New Job Ticket" button 220 on the main screen of the application (see FIG. 2). This would open a new form for the dispatcher in which they could specify the service technician's name, job ticket number, work location and a description of the job that needs to be performed (see FIG. 3). FIG. 6 shows that after the dispatcher presses the "send" button at step 601, the software reviews at step 602 the dispatch order to confirm that the minimum required fields are complete. Step 603 then formats the message for transmission.

To transmit in an SMS format, the software measures the message length. If the message is less than 160 characters, step 604a translates the message into an SMS message, step 604b updates the database and step 604c adds an order icon to the job list. If the message is more than 160 characters, step 605 creates multiple SMS messages and performs the other tasks set out in step 604a-c. Persons skilled in the art will recognize that the dispatch software can be modified to parse dispatch orders into message packages having a variety of forms, lengths, fields, etc. Thus, by way of example, the message package can be parsed into a GPRS data packet for transmission over a GPRS network such as a two-way paging network. Or, currently deployed formats such as two-way paging could be used to transmit a message formatted by the dispatch software for that type of network. In any event, upon completion of the dispatch order form, after the dispatcher clicks the "Send" button 302, the steps identified in FIG. 6 translate the information into a message that can be delivered over SMS, GPRS paging or other networks to the specified service technician.

Referring to FIG. 1, the message is sent via the communications device 112 connected to her computer 130 to the desired service technician's communication device 110. Upon receipt of the SMS message, the service technician's communication device 110 notifies the driver (e.g., by beeping, vibrating or displaying the message) and the new job ticket is added to his database waiting for review. When the service technician is ready for the next assignment, she opens up the database on the dispatch order and drives to the specified address to perform the necessary job. She can then enter any pertinent information into the dispatch order ticket and mark it closed or put in another description, such as a description indicating whether a new part is needed, whether another type of service is needed or whether payment was collected. She then presses the send button and the information is sent via the communication device 110 back to the dispatcher's communication device 112, and thence to the computer 130. The SMS message is processed by the dispatch software as described in FIGS. 4 and 5 so that the dispatch order is pulled, updated and restored to reflect the new information the service technician specified.

Figure 7:
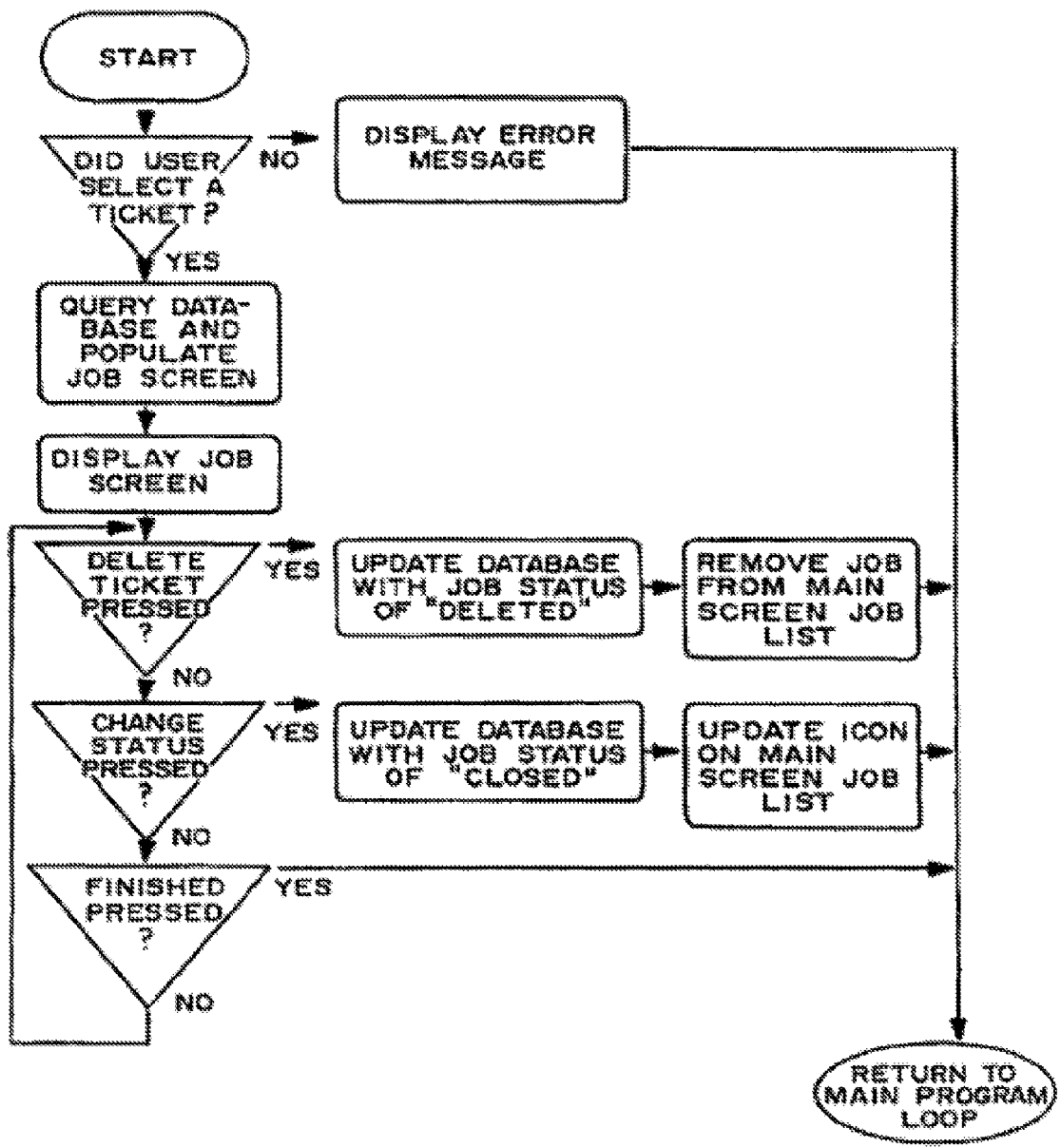
FIG. 7 is a flow chart depicting exemplary steps for viewing selected tickets within the dispatch application.
Figure 8:
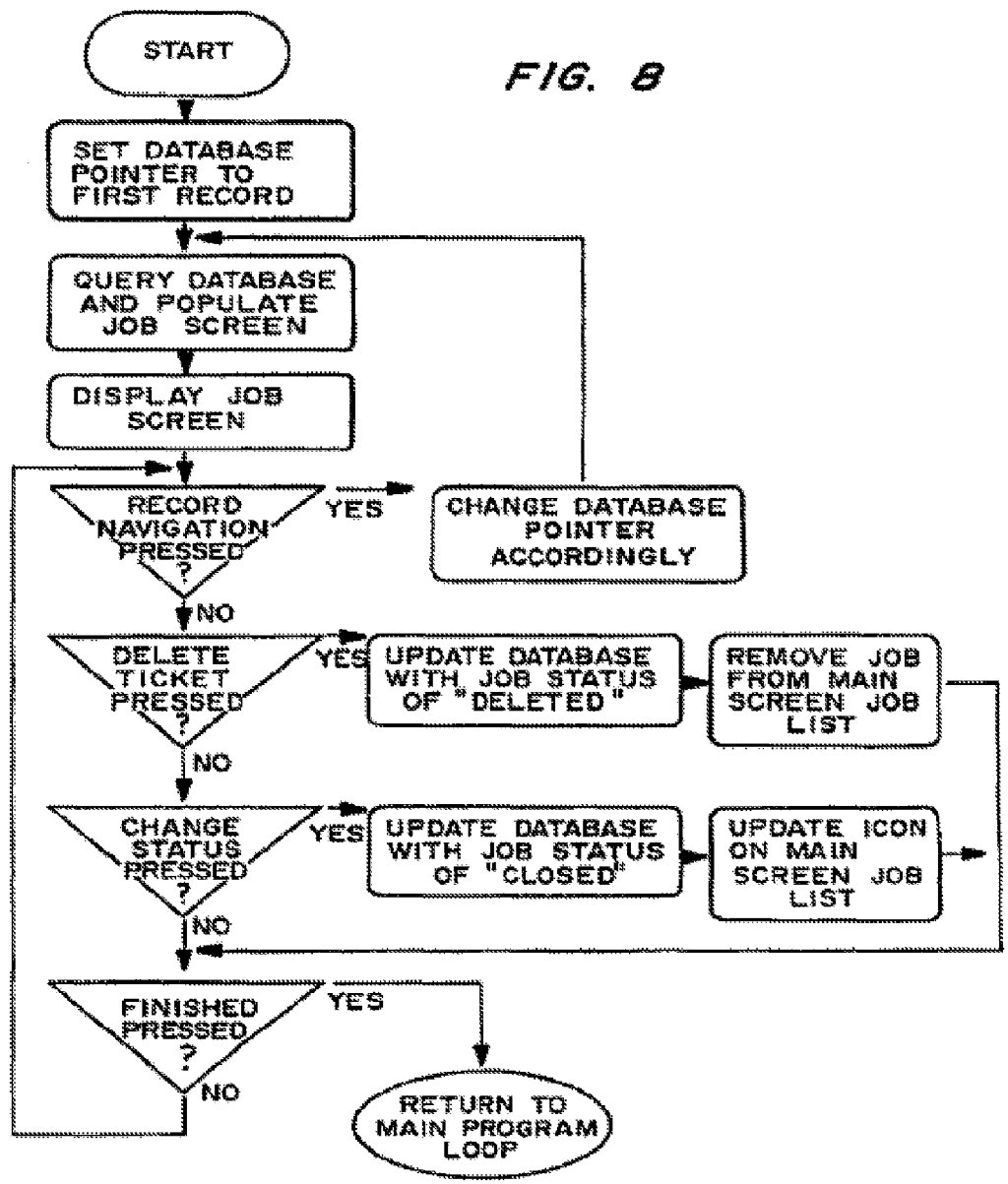
FIG. 8 is a flow chart depicting exemplary steps for viewing and managing all tickets in the dispatch application.

If the service technician closes the job or task to which the dispatch order relates, the dispatch software removes the ticket from the open list and adds it to the closed list under the proper service technician's name in the main display. The program will also update the ticket to show the time that the ticket was closed. The dispatcher can open up any dispatch order or job ticket listed on the main display and review the dispatch order information, as shown in FIG. 7. The dispatcher also has the capability to view all dispatch orders and manually to close or delete a dispatch order, as shown in FIG. 8. If a dispatcher manually closes a dispatch order, the notes field in the ticket is updated to show that it was closed by a dispatcher.

Since the display can become cluttered when there are a larger number of tickets, the dispatcher also has the ability to remove a ticket from view permanently. This can only be done to closed tickets. Removed tickets remain in the database but are marked in such a way that they will not show upon the main view.

Although the invention has been shown and described with respect to particular embodiments, it should be understood by those skilled in the art that various changes, omissions, and additions may be made to the form and detail of the disclosed embodiments without departing from the spirit and scope of the invention, as recited in the following claims.

What is claimed:

1. A method comprising:
creating a dispatch order;
determining a length of the dispatch order;
based upon the determined length, formulating the dispatch order into multiple related Short Message Service (SMS) messages;
reformatting the multiple related SMS messages into at least one Internet Protocol (IP) packet;
sending the at least one IP packet over an IP network;
receiving, via a public network, multiple related SMS messages corresponding to the dispatch order, the multiple related SMS messages having been reformatted from the at least one IP packet; and sending over the public network a reply message comprising an updated status of the dispatch order, wherein the updated status is one of pending, received, in progress, completed, or problem.

2. The method of claim 1, wherein the public network comprises a wireless network.

3. The method of claim 2, wherein the wireless network comprises a GPRS network.

4. The method of claim 2, wherein the wireless network comprises a GSM network.

5. The method of claim 2, wherein the wireless network comprises a CDMA network.

6. The method of claim 2, wherein the wireless network comprises a two-way paging network.

7. The method of claim 1, wherein the dispatch order comprises at least one of: a ticket number, a service location, a description of services required, a priority of the dispatch order, or a creation time of the dispatch order.

8. The method of claim 1, wherein a communication device is coupled to a computer, the computer being operative to display a plurality of dispatch orders corresponding to customer service records stored in a memory, wherein the displayed dispatch orders are organized by status.

9. The method of claim 1, wherein the message corresponding to the dispatch order is sent to multiple recipients chosen from a database of service technicians.

10. Memory in a dispatch computer having stored thereon executable instructions, the executable instructions, when executed by the dispatch computer performs operations comprising:

creating a dispatch order;

determining a length of the dispatch order;

based upon the determined length, formulating the dispatch order into multiple related Short Message Service (SMS) messages;

reformatting the multiple related SMS messages into at least one Internet Protocol (IP) packet;

sending the at least one IP packet over an IP network;

receiving, via a public network, multiple related SMS messages corresponding to the dispatch order, the multiple related SMS messages having been reformatted from the at least one IP packet; and sending over the public network a reply message comprising an updated status of the dispatch order, wherein the updated status is one of pending, received, in progress, completed, or problem.

11. The memory of claim 10, wherein the public network comprises a wireless network.

12. The memory of claim 11, wherein the wireless network comprises a GPRS network.

13. The memory of claim 11, wherein the wireless network comprises a GSM network.

14. The memory of claim 11, wherein the wireless network comprises a CDMA network.

15. The memory of claim 11, wherein the wireless network comprises a two-way paging network.

16. The memory of claim 10, wherein the dispatch order comprises at least one of a ticket number, a service location, a description of services required, a priority of the dispatch order, or a creation time of the dispatch order.

17. The memory of claim 10, wherein a communication device is coupled to the dispatch computer, the dispatch computer being operative to display a plurality of dispatch orders corresponding to customer service records stored in the memory, wherein the displayed dispatch orders are organized by status.

18. The memory of claim 10, wherein the message corresponding to the dispatch order is sent to multiple recipients chosen from a database of service technicians.

* * * * *